US005339522A

United States Patent [19]

Paquin et al.

[11] Patent Number: 5,339,522

[45] Date of Patent: Aug. 23, 1994

[54] METHOD FOR CONSTRUCTING MODULAR DOORS

[75] Inventors: Georges A. Paquin, Brossard; Claude Deroy, Quebec, both of Canada

[73] Assignee: Groupe Herve Pomerleau Inc., Montréal, Canada

[21] Appl. No.: 44,209

[22] Filed: Apr. 8, 1993

Related U.S. Application Data

[63] Continuation of Ser. No. 712,715, Jun. 10, 1991, abandoned.

[51] Int. Cl.[5] ........................ B23P 17/02; E06B 3/16; E04C 2/34

[52] U.S. Cl. ................................ 29/897.312; 29/462; 29/897.32; 49/506; 52/741.1

[58] Field of Search .................. 29/897, 897.3, 897.31, 29/897.312, 897.32, 460, 462, 463, 469.5, 530; 52/455, 741.1, 828, 829, 830, 741.4; 49/501, 502, 504, 506

[56] References Cited

U.S. PATENT DOCUMENTS

| | | | |
|---|---|---|---|
| 1,003,070 | 9/1911 | Sjobring | 29/897.312 X |
| 1,136,238 | 4/1915 | Kirby | 29/897.312 X |
| 1,242,283 | 10/1917 | Walther | 29/897.312 X |
| 1,793,081 | 2/1931 | Goddard | 29/897.32 X |
| 3,987,588 | 10/1976 | Imperial et al. | 52/829 X |
| 4,125,925 | 11/1978 | Weyant | 29/897.3 |
| 5,125,155 | 6/1992 | Kyle et al. | 29/897.32 |

*Primary Examiner*—Peter Dungba Vo

*Attorney, Agent, or Firm*—Robic

[57] ABSTRACT

A method for constructing a modular door is disclosed. The door has a front surface member and a rear surface member that are identical in shape and each formed of modular elements made of stamped sheet metal. The door also incorporates reinforcing wood boards glued between the front and rear surface members, as well as foam injected between the boards and members. This makes the door very solid and well insulated. The construction of this door is easy, cost and time saving and not waste producing.

7 Claims, 5 Drawing Sheets

METHOD FOR CONSTRUCTING MODULAR DOORS

CROSS-REFERENCE

This application is a continuation-in-part of application Ser. No. 07/712,715 filed on Jun. 10, 1991 now abandoned.

BACKGROUND OF THE INVENTION a) Field of the Invention

The present invention relates generally to modular doors, and is more specifically directed to a method for constructing such doors.

b) Brief Description of the prior Art.

As it is well known, metal doors, especially steel doors, are generally made of two steel plates mounted on both sides of a reinforcing structure such as a wood frame, that is filled up with polyurethane. If one wishes a window in the door, an opening must be made in the steel plates forming the door and in the reinforcing structure to receive the window. The cost involved for making this opening and installing in it the window add to the total costs. The elements which are removed, also cause pollution.

OBJECT AND SUMMARY OF THE INVENTION

A first object of the present invention is to provide an improved method of manufacturing and assembling a modular door, especially steel doors, which overcomes at least in part the above mentioned problems.

Another object of the invention lies in the modular metal door obtained by this improved method, this door comprising:

a front surface member and a rear surface member, these members being identical in size and each formed of a pair of spaced-apart stiles made of stamped sheet metal such as steel, or of extruded or molded plastic material such as PVC, each stile preferably having a pair of lateral, lengthwise extending flanges and a pair of opposite end flanges, each pair of stiles of the front and rear surface members being joined together by at least one upper crosspiece and one lower crosspiece that are both made of stamped sheet metal, or of extruded or molded plastic material, so as to define a rectangular framework which itself define at least one central open area;

rigid reinforcing means such as wooden boards or studs or members made of suitable rigid plastic material which are mounted between the two sets of stiles and crosspieces of the front and rear surface members, the reinforcing means being secured to the boards and crosspieces and defining the thickness of the door; and a plastic foam material injected into the space left between the reinforcing means, the stiles and the crosspieces, to insulate and further solidify the door.

Of course, the lengths of the stiles and crosspieces may vary to fit different door frames.

A window, a screen of a filling panel may also be fitted in the open areas of the rectangular frame works and fixed therein with sealing means to complete the door and make it air tight and/or water tight.

In accordance with the invention, the above mentioned structural elements of the modular door are assembled by a method comprising the following steps;

1) securing together, preferably by welding, the stiles and crosspieces of the front surface member of the door in order to assemble said front surface member (for the purpose of description the front surface member of the door is assembled first, although the rear surface member could also be assembled first)

2) securing, preferably with a glue, the reinforcing means of the door to the rear of the stiles and crosspieces of the front surface member;

3) repeating step (1) with the stiles and crosspieces of the rear surface member of the door in order to assemble this rear surface member;

4) securing, preferably with a glue, the rear surface member to the reinforcing means so as to be exactly opposite to the front surface member;

5) injecting an insulating foam made of a suitable material into the spaces left inside the door; and 6) fixing an element of precise dimension selected from the group consisting of windows, panels and screens, into the open areas of the rectangular frameworks of the door in order to close said open areas, such a fixation being preferably carried out with a molding that is adhered to the perimeter of the window or panel or screen to firmly attach the latter in place on both the front and rear surface members of the door.

BRIEF DESCRIPTION OF THE DRAWINGS

The invention will be better understood upon reading of the following, non-restrictive description of a preferred embodiment thereof, given with reference to the accompanying drawings, in which.

DETAILED DESCRIPTION OF A PREFERRED EMBODIMENT OF THE INVENTION

Figure 1:
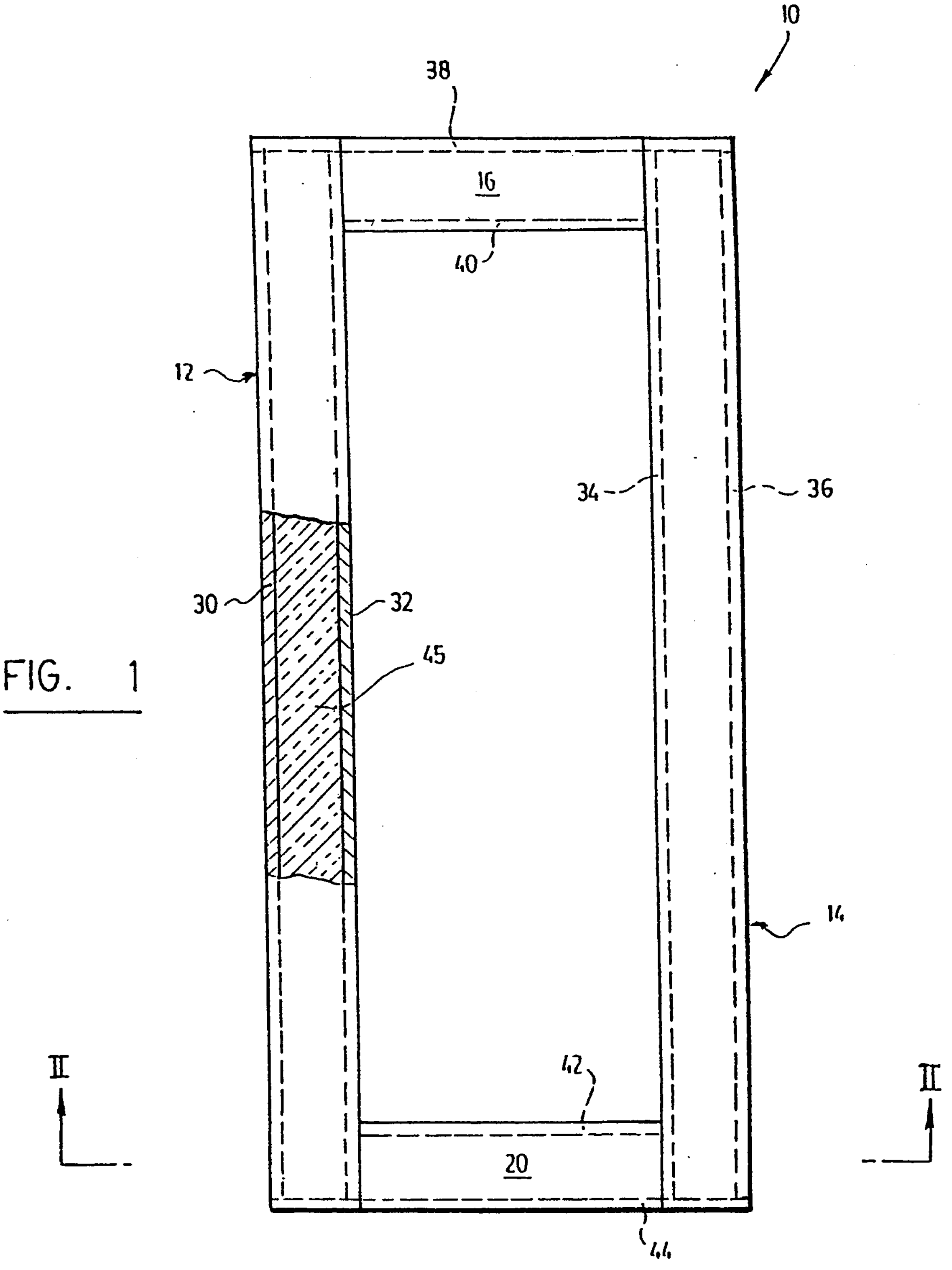
FIG. 1 is a front elevational view of the framework of a modular steel door according to the invention, being partially broken away to show the reinforcing wood studs and foam.
Figure 3A:
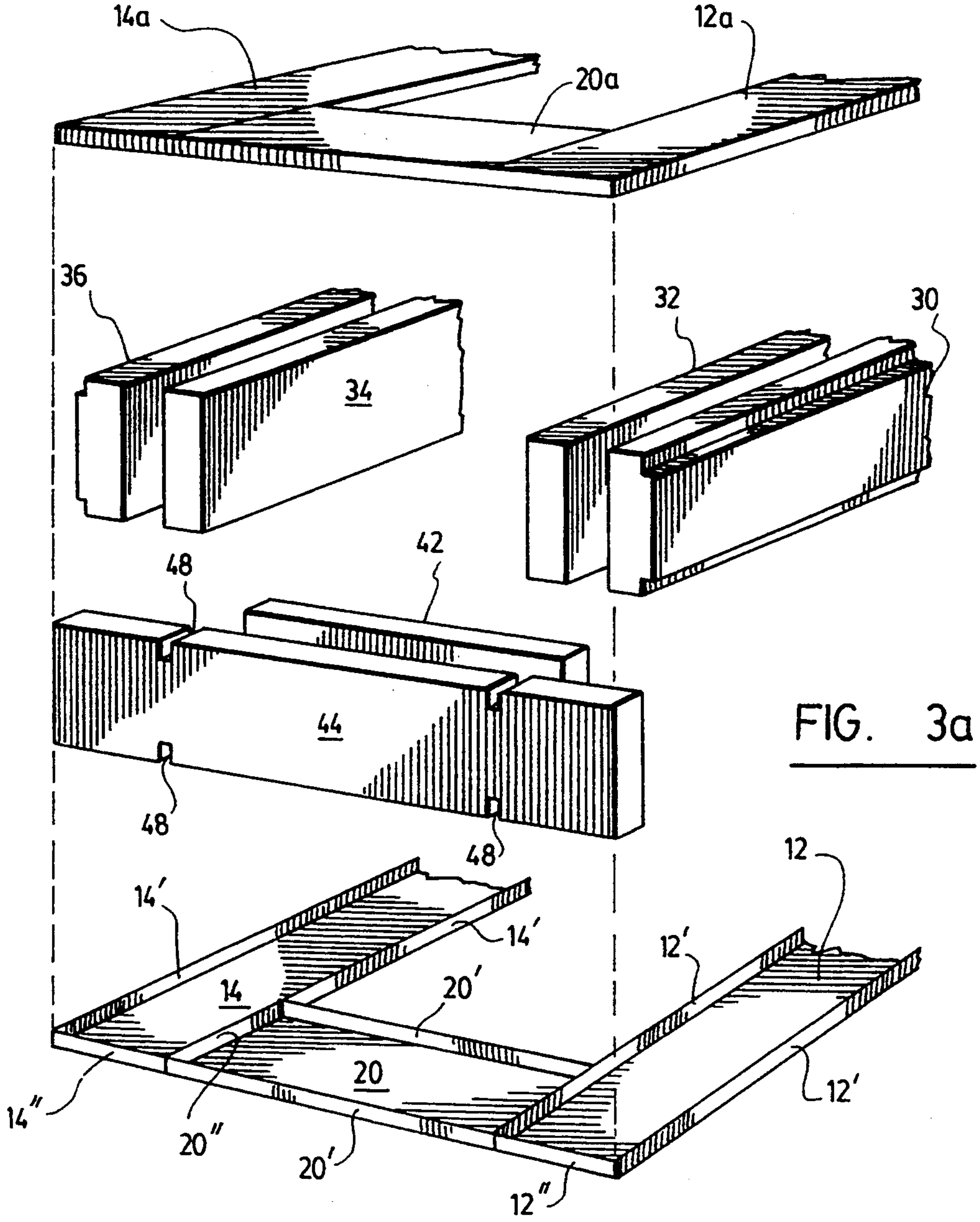
FIG. 3*a* is an exploded perspective view of an end portion of the door showing the stiles, crosspieces and wooden boards.
Figure 3B:
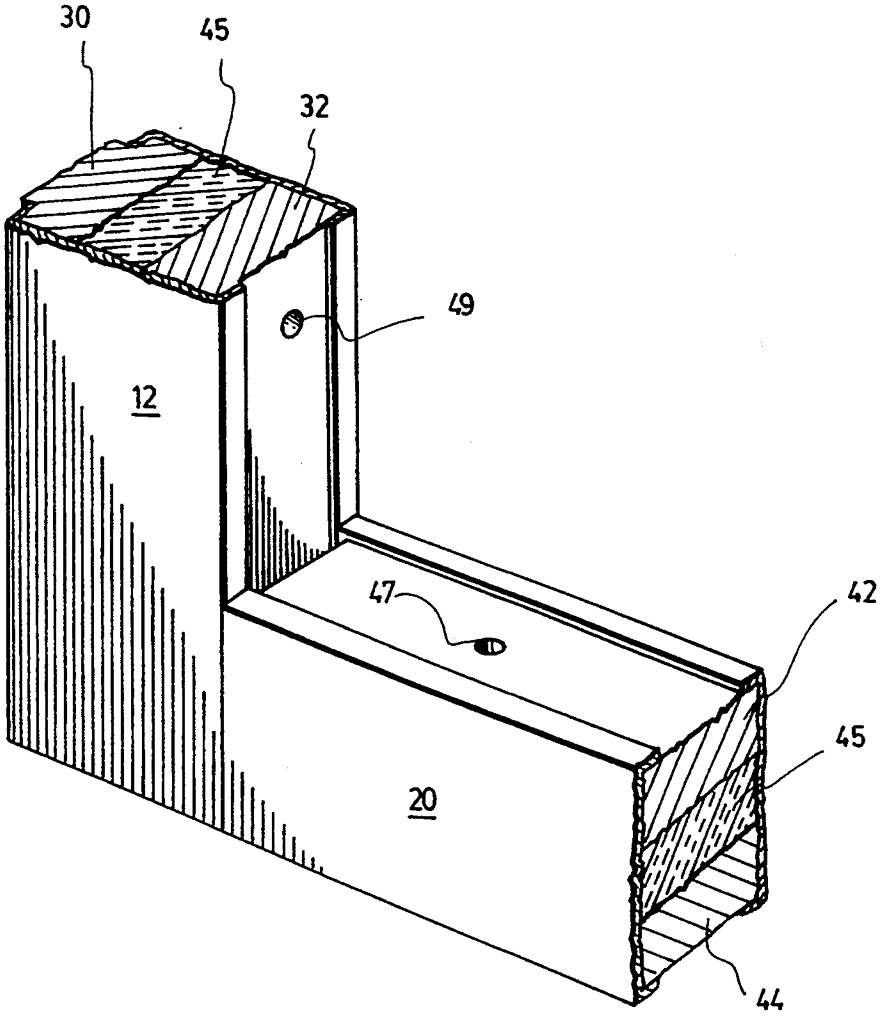
FIG. 3*b* is a perspective view of a portion corner of the door, showing its adjacent stiles, crosspieces and reinforcing studs.
Figure 6:
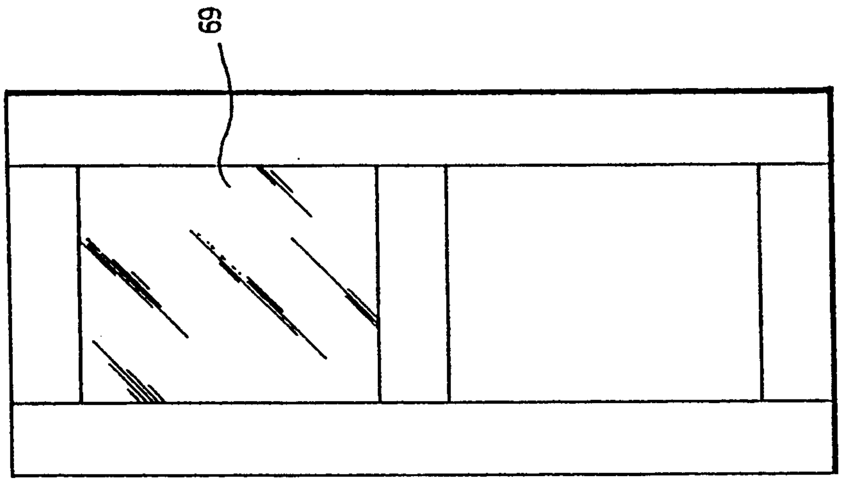
FIGS. 5 and 6 are elevational views similar to that of FIG. 4, showing the same door fitter with a screen and a window, respectively.
Figure 5:
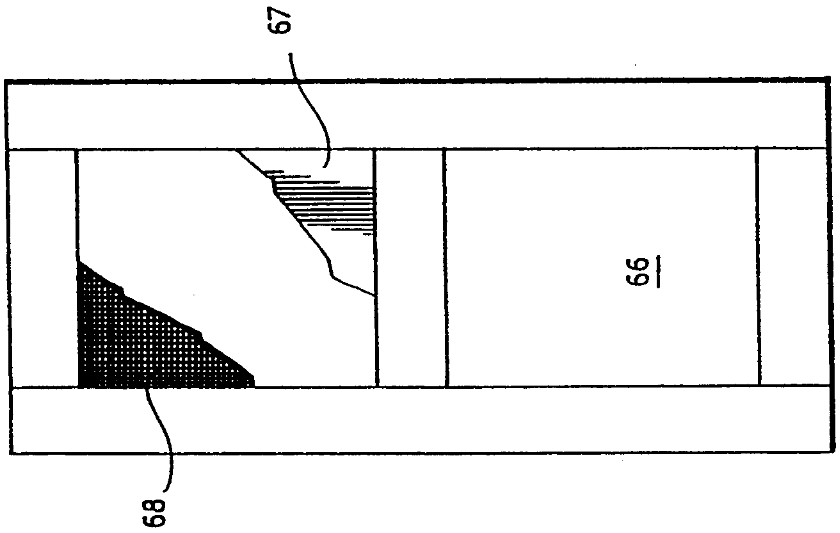
Figure 4:
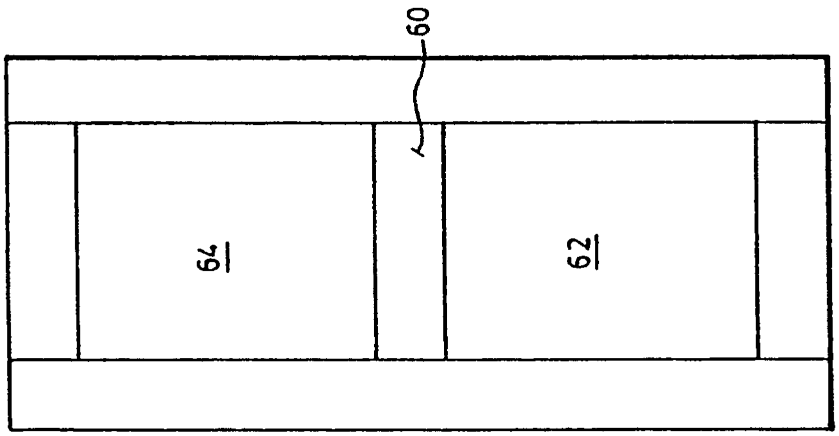
FIG. 4 is an elevational view of a door according to the invention fitted with two panels.

As is shown in FIG. 1, the metal door 10 according to the invention is made of a plurality of modular elements. More particularly, the door 10 comprises a front surface member including a left stile 12 and a right stile 14. The latter are parallel and are joined by an upper crosspiece 16 and a lower crosspiece 20. If desired, the stiles 12 and 14 may also be joined by one or more intermediate crosspieces 60, as is shown in FIGS. 4 to 6. Each stile and crosspiece is made of stamped sheet metal, preferably steel, although other metals such as aluminum could be used. Each stile and crosspiece could alternatively be made of molded or extruded plastic material, such as PVC. These elements are manufactured in predetermined dimensions to fit any given door frame. Each stile and crosspiece is also integrally formed with short, rearwardly projecting flanges as is depicted in FIG. 3*a*. When it is made by stamping or molding, the stile 12 has a pair of lengthwise extending flanges 12' and end flanges 12". Similarly, the stile 14 is formed with lengthwise flanges 14' and end flanges 14", while the crosspieces 16, 20 are provided with flanges 16', 16" and 20', 20", respectively. However when the stiles and crosspieces are made by extrusion, they do not have end flanges.

The first step to be carried out to assemble the door 10 consists in positioning the lower ends of the stiles 12 and 14 adjacent to the flanges and in line with the lower edge of the lower crosspiece 20, so that the edges or end flanges 20" of the crosspiece 20 are in contact with the inner flanges 12', 14' respectively of the two stiles 12 and 14. These edges and/or flanges in contact are then secured together preferably by welding although riveting or bolting could also be used. An identical procedure is followed with upper crosspiece 16. Thus, a rectangular front surface member is assembled.

The door 10 also comprises reinforcing means which consists of a plurality of rigid members 30, 32, 34, 36, 38, 40, 42 and 44, whose thickness, length and width are selected to fit the dimensions of the door and door frame in which is to be located the door, as will be better explained hereinafter.

Figure 2:
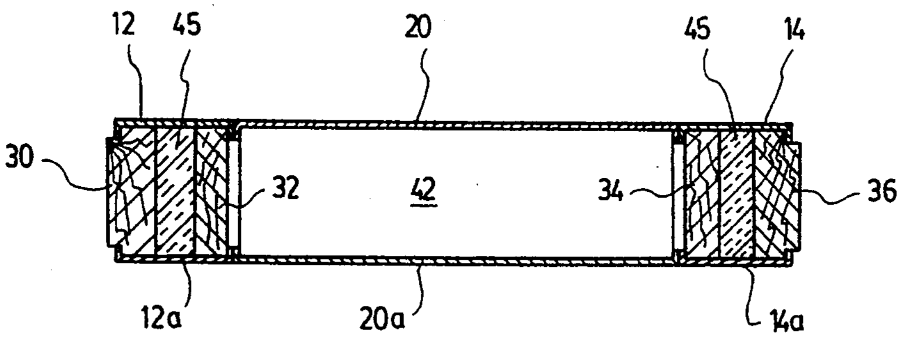
FIG. 2 is a cross-sectional view taken along lines II—II of FIG. 1.

The second step to be carried out consists of securing the reinforcing means to the rear of the stiles 12 and 14 and crosspiece 16, 20 that ar already welded together. The reinforcing means preferably consists of wooden studs or boards although rigid plastic boards could also be used. More particularly, the reinforcing means includes a lower transverse board 44 whose lengths substantially equal to the width of the door. This board 44 which is positioned adjacent to the flanges 12', 20' and 14" to define the bottom edge of the door, is advantageously formed with a pair of notches 48 positioned to be aligned with, and give room to the welded flanges 12', 20" and 14', 20", respectively. The reinforcing means also includes an upper transverse board 38 defining the upper edge of the door. The board 38 defining the notches aligned with the welded flanges 12', 16" and 14', 16", respectively. The reinforcing means further includes second transverse boards 42 and 40 whose purpose is to reinforce the other, opposite edges of the lower and upper cross-pieces, respectively. The reinforcing means finally comprises a pair of parallel, spaceapart long boards 30, 32 and 34, 36 secured to each of the left and right stiles 12 and 14, respectively, adjacent to the longitudinal flanges 12' and 14' of the same. As clearly shown in FIG. 2, the boards 30 and 36 have their two outer edges grooved so that their external faces project slightly outwardly from the adjacent flanges 12', 14'. Thus hinges or sealing means (not shown) can easily be secured to the boards to complete attachment of the door 10 to its frame.

In this second step, all the boards are preferably secured to the stiles and crosspieces by a suitable glue.

The third step to be carried out to assemble the door 10 consists in assembling and welding stiles **12*a*, 14*a* and crosspieces 16*a* (not being shown) and 20*a* identical to those previously described, so as to form a rear surface member identical in shape and dimensions to the front one. This rear surface member forms another structural element of the door 10**.

In a fourth step, this rear surface member is secured to the reinforcing means in the very same way as the front surface member, i.e. preferably by gluing.

The fifth step that must necessarily be carried out to complete the door 10 consists in injecting a foam material 45 through holes 47 and 49 made into the door framework. The injection of foam must of course be repeated to fill up every internal spaces left between the stiles and crosspieces.

The last structural element(s) of the door 10 are shown in FIGS. 4 to 8. The fixation of these elements forms the sixth and last step to be carried out to complete the construction of the door 10. Assuming as is shown, that a third crosspiece 60 is added to the door framework, the interior area of the framework is divided into to open areas that are to be closed. In accordance with the invention, this can be done by filling the open areas with two solid panels 62 and 64 as shown in FIG. 4; with a solid panel 66, a window 67 and a screen 68 as shown in FIG. 5; or with a glass pane 69 and a solid panel 70 as shown in FIG. 6. Once in place, these various elements may be permanently sealed in placed by suitable perimetrical moldings (not shown).

Figure 7:
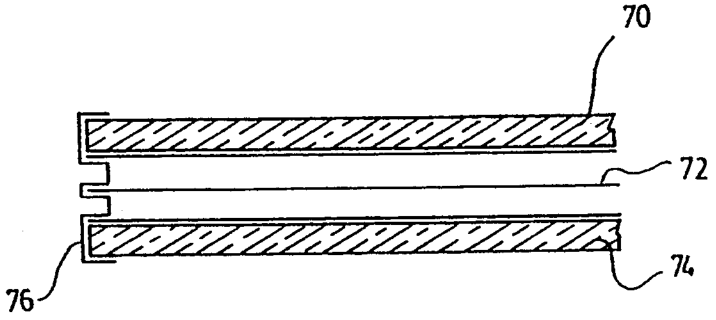
FIGS. 7 and 8 are cross-sectional views of two types of sealed window that can be fitted in the door according to the invention.
Figure 8:
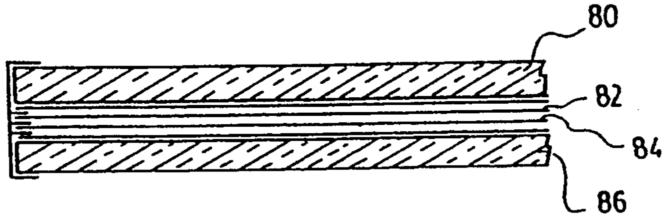

The window units of FIGS. 7 and 8 comprise glass panes 70, 74 and 80, 86 each of which may be coated with a thin metallic coating and each of which contain in sandwich between them one or more thin polyester sheets, as is known.

It is to be noted that if it is desired to paint the door, there will be no particles of foam adhering to the paint when the above method is followed.

Other resulting advantages of the invention may be stated as follows:

1—The door 10 does not twist, bend or otherwise deform.

2—No water or air can penetrate between the window unit and the door framework.

3—The door 10 is very solid. As a matter of fact, it has been found that the structural strength of previous doors is reduced by as much as fifty % when material is cut away to install a window or other element in the interior area.

4—The construction cost of the door 10 are substantially reduced, as no cutting to adjust its dimensions to the door frame or to add windows or screns is required.

5—This construction is easy to carry out time-saving, and not waste producing.

6—Last of all, the door 10 may be of any preselected thickness, as this thickness depends exclusively on the width of the wooden boards. As a result, thicker insulated doors of, say, 2.25 inches, may easily be produced to meet high insulation requirement.

We claim:

1. A method for constructing a modular door, said method comprising the following steps:

a) providing a first set of structural elements comprising a first upper crosspiece, a first lower crosspiece and two first stiles, each of said first crosspieces and first stiles of said first set being in the form of a sheet and having a back side, b) placing the first stiles in spaced-apart position and securing said first stiles to the first lower crosspiece and to the second upper crosspiece in order to form a front surface member that is rectangular in shape and provided with at least one central open area;

c) securing reinforcing means in parallel, spaced apart relationship to and along the back side of each said first stiles and said first crosspieces forming said front surface member, said reinforcing means defining the thickness of the door;

d) providing a second set of structural elements identical in size to the elements of the first set, said second set comprising a second upper cross-piece, a second lower crosspiece and two second stiles, each of said second crosspieces and second stiles of said second set being in the form of a sheet and having a back side;

e) placing the second stiles in spaced apart position and securing said second stiles to the second lower crosspiece and to the second upper crosspiece in order to form a rear surface member identical in size and shape to said front surface member;

f) securing the back sides of said second stiles and said second cross-pieces forming said rear surface member to the reinforcing means so that said rear surface member is exactly opposite to the front surface member;

g) injecting an insulating foam into every closed space defined by the front and rear surface members and the reinforcing means of the door; and h) fixing with a precise fitting, at least one element selected from a group consisting of windows, panels and screens into the open areas of the front and rear surface members so as to close said open areas.

2. The method of claim 1, wherein said reinforcing means consists of wood boards and wherein steps (c) and (f) are carried out by gluing said boards to said front and rear surface member, respectively.

3. The method of claim 2, wherein said first and second stiles and crosspieces forming said front and rear surface members are made of stamped metal sheet and are each provided with lengthwise flanges and with end flanges and wherein steps (b) and (e) are carried out by welding the end flanges of the crosspieces to the adjacent lengthwise flanges of the corresponding stiles.

4. The method of claim 3, comprising the additional step of:

adhering a peripheral molding to each of the elements fixed in step h) on both the sides of said door.

5. The method of claim 2, wherein each of said first and second stiles has an outer board having an outer face with opposite outer edges grooved so that said outer face projects slightly outwardly of said stile.

6. The method of claim 2, wherein in steps (b) and (e), utilizing first and second intermediate crosspieces that are secured to the first and second stiles together with the first and second upper and lower crosspieces, respectively.

7. The method of claim 2, wherein in step (h), utilizing at least one sealed window as said at least one element.

* * * * *